UNITED STATES PATENT OFFICE.

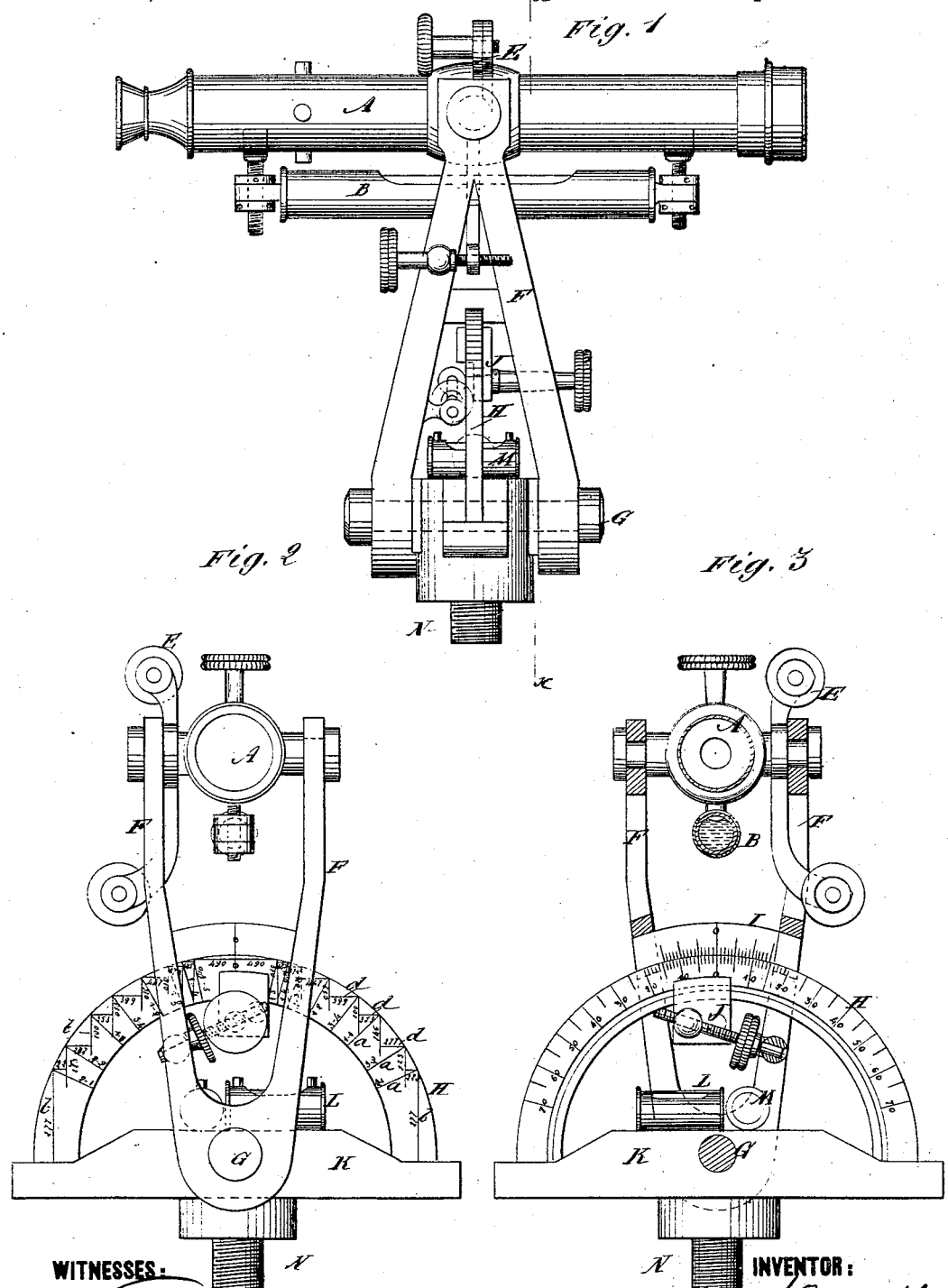

MATTHEW W. VENABLE, OF KING'S MOUNTAIN, KENTUCKY.

IMPROVEMENT IN SURVEYING-INSTRUMENTS.

Specification forming part of Letters Patent No. 181,881, dated September 5, 1876; application filed June 20, 1876.

*To all whom it may concern:*

Be it known that I, MATTHEW W. VENABLE, of King's Mountain, in the county of Lincoln and State of Kentucky, have invented a new and Improved Surveying-Instrument, of which the following is a specification:

The invention will first be fully described in connection with the drawing, and then pointed out in the claim.

Figure 1 is a side elevation of my improved instrument. Fig. 3 is a rear elevation; and Fig. 3 is a sectional elevation taken on the line *x x* of Fig. 1.

A represents the telescope; B, the long level attached to it; E, the clamp and tangent arrangement for fastening and adjusting it; and F the standard for supporting the telescope, which said standard I propose to construct in the crotched or branched form represented in the drawing, and to mount on the axis G, in the plane of the optical axis of the telescope, with the vertical graduated semicircular limb H under the transverse axis of the telescope and between the legs of the standard, the center of which is in the center of the axis G, and with which is a vernier, I, attached to the standard, to work in connection with the graduated limb; and J is the clamp and tangent arrangement connected with the vernier. The vertical limb H is mounted on a bar, K, which has two levels attached, one, L, being parallel to it, and the other, M, at right angles, and it has a spindle, N, that fits into a collar and socket carrying the clamp and tangent arrangement of the ordinary instrument for horizontal movements; also the leveling-screws and parallel plates. It will also be furnished with a hook, plumb-bob, and tripod similar to a transit.

The side of the vertical limb seen in Fig. 3 is graduated to degrees and half degrees, and the other side is graduated at *a*, so as to show the angle of the slopes ordinarily used from one in five to two in one; also, with vertical decimals *b*, which are fractions of one foot, and represent loss in height of instrument in revolving the standards to a given angle, and are used to correct height of instrument in setting stakes; and also with horizontal decimals *d*, which are fractions of one foot, and show the amount to be added to or subtracted from the rod-reading, on account of a change of position of the center of the telescope to the right or left of the center of the bar by revolving the standards on their axis. The vertical decimals are the versed sines of the angle turned for a radius equal to the distance from axis of standards to center of telescope. The horizontal decimals are the co-sines of the angle turned, calculated for the same radius.

The operation is as follows: In the first place, having a level under the telescope, and clamp and tangent arrangements for it, it can evidently be used as an ordinary level.

To explain its use for setting slope stakes, it can be most readily understood by taking an example: Set one stake by the ordinary method accurately, as to distance out and elevation, as compared with a convenient bench-mark; then set the instrument over the point on the stake, and, by reference to bench-mark, again determine the height of instrument. Say, for instance, the slope stake is eighteen (18') feet from the center-line of the roadway, and set for a one to one (1 to 1) slope, and the difference between height of instrument and height of stake is 5'.45, and we wish to set slope stakes for an excavation with a base of sixteen feet; now, let the rodman and tapeman go ahead to some convenient center station, (if the line be straight,) and measure out accurately again eighteen feet, and set the instrument on the rod, and clamp the horizontal clamp; now, revolve the standard down until zero of the vernier corresponds with forty-five degrees, or a one to one slope; then deduct from the height of instrument the decimals for an instrument (six-inch radius, say) .146—we have 5.304 for corrected height of instrument. Then the target on the rod, set at 5.304, would give us points on the intersection of slope and surface by moving to the right or left until the intersection of cross-hairs cut the center of target, but for the fact that we have gained in distance out, by revolving the standards, so as to correct that, in excavation we deduct from the rod reading the decimals .353, (for a six-inch instrument,) and in embankment we add it to the rod-reading, so in this instance the corrected rod would be 4.591. Now, if the grade is level whenever we set the rod (the cross-hairs cutting the center of target) we have a point on the intersection of slope and surface, and if the grade rises or falls make the correction on the rod in proportion to the distance, as in ordinary running with the level. If the base in excavation and embankment is the same, (say, 16',) we may set stakes until we come within eight feet of the center; there the cutting is naught, (0,) and the peg is at grade; put in a point carefully and move up to this; set the instrument at 0; take a foresight by measuring out eight (8) feet from some station ahead, clamp horizontally, revolve standards to the embankment-slope required, make the two connections on rod for height of instrument and displacement, and proceed as before.

If excavation or embankment continue for some distance, and it is desirable to move up, set two points ahead carefully on the slope, and move up to the one nearest the instrument, and after leveling up, &c., revolve to the slope used, and then take a foresight on the other point, the rod-reading being corrected as before for height of instrument and displacement, and continue setting the stakes. If the width of road-bed in excavation and embankment is the same, and we are at a grade-point, we need not move the instrument, but simply revolve in the opposite direction, correct for new slope, and continue setting stakes till we come to another grade-point, and so on. On a curve, of course, we will have to set at zero (0) of the vertical limb, take a foresight opposite each center-stake, and revolve the standards down and set the stakes; but even with that trouble it is vastly more rapid than the old method, especially when the ground is rough, and very much broken transversely.

Another use for the instrument is for finding the gradient between two given points, either one point at the instrument and the other at a distance, or both at a distance, but instrument and points in the same line. For this purpose stadia-wires or a micrometer arrangement are necessary in the telescope, as some transits are fixed. Send the rodman ahead to the desired point, and have him set his target at the height of the instrument above the ground where it stands; then sight to his rod held vertically; then let him measure to the right or left, say ten (10) feet, and hold his rod again; now revolve the standards until the cross-hairs of telescope cut the center of target, and then the co-tangent of the angle read, multiplied by ten (10) feet, will give the difference of level between the points; and in the same way find the difference between instrument and the second point, and with the stadia-wires the approximate distance, and we have the approximate gradient.

In practice, where a person does not wish to purchase a clinometer-level and an ordinary engineer's level too, it would be a good arrangement to have the telescope of the clinometer-level made with bands to rest in the Y's, just as the ordinary level does, and have an extra bar, Y's, and spindle made to fit the same tripod, leveling-screws, and spindle-socket of clinometer-level, and the instrument could then be changed at pleasure. The trunnions on the clinometer-level are very short, and would not be a serious inconvenience to the level; but on ordinary railroad construction, where the levels have been carefully run and bench-marks established and tested, the clinometer-level is then all the level that is necessary; and it is also convenient for setting centers and grades on tangents, and so will frequently do away with the necessity of taking two instruments to the field.

Having thus described my invention, I claim as new and desire to secure by Letters Patent—

The vernier, and clamp and tangent arrangement J, in combination with the vertical semicircular limb H and the telescope-standard F, arranged on the axis G, and in relation to the said limb H, as described.

MATTHEW W. VENABLE.

Witnesses:
JNO. J. M. ROBERTS,
A. A. MCKINNEY.